(12) United States Patent
Wang et al.

(10) Patent No.: US 11,299,586 B2
(45) Date of Patent: Apr. 12, 2022

(54) FLUORINATED ETHER POLYMER, THE PREPARATION METHOD THEREFORE AND USE THEREOF

(71) Applicant: Akzo Nobel Coatings International B.V., Arnhem (NL)

(72) Inventors: Jianhui Wang, Kunshan (CN); Junbiao Lu, Shanghai (CN); Zhenglin Xu, Shanghai (CN); Zheng Shi, Shanghai (CN); Shili Xing, Shanghai (CN)

(73) Assignee: Akzo Nobel Coatings International B.V., Arnhem (NL)

( * ) Notice: Subject to any disclaimer, the term of this patent is extended or adjusted under 35 U.S.C. 154(b) by 57 days.

(21) Appl. No.: 16/955,666

(22) PCT Filed: Dec. 21, 2018

(86) PCT No.: PCT/EP2018/086523
§ 371 (c)(1),
(2) Date: Jun. 18, 2020

(87) PCT Pub. No.: WO2019/129691
PCT Pub. Date: Jul. 4, 2019

(65) Prior Publication Data
US 2020/0385518 A1    Dec. 10, 2020

(30) Foreign Application Priority Data

Dec. 26, 2017  (WO) ................ PCT/CN2017/118492
Apr. 4, 2018  (EP) .................................... 18165713

(51) Int. Cl.
| | | |
|---|---|---|
| C08G 65/00 | (2006.01) | |
| C08G 63/682 | (2006.01) | |
| C08G 65/332 | (2006.01) | |
| C08L 51/08 | (2006.01) | |
| C09D 151/08 | (2006.01) | |

(52) U.S. Cl.
CPC ......... C08G 65/007 (2013.01); C08G 63/682 (2013.01); C08G 65/3322 (2013.01); C08L 51/08 (2013.01); C09D 151/08 (2013.01); C08G 2650/48 (2013.01)

(58) Field of Classification Search
None
See application file for complete search history.

(56) References Cited

U.S. PATENT DOCUMENTS

| | | |
|---|---|---|
| 5,476,721 A | 12/1995 | Simeone et al. |
| 5,589,552 A | 12/1996 | Simeone et al. |
| 5,670,573 A | 9/1997 | Kirchner et al. |
| 5,859,126 A | 1/1999 | Anton et al. |
| 5,959,058 A | 9/1999 | Tonelli et al. |
| 2003/0199621 A1* | 10/2003 | Jariwala ............. C08G 63/6824 524/288 |
| 2005/0249940 A1* | 11/2005 | Klun ........................ B32B 5/16 428/323 |
| 2013/0012647 A1 | 1/2013 | Mihara et al. |

FOREIGN PATENT DOCUMENTS

| | | |
|---|---|---|
| CA | 679907 | 2/1964 |
| EP | 2277962 | 1/2011 |
| JP | H05279435 | 10/1993 |
| JP | 5397686 | 11/2013 |
| WO | 2004024814 | 3/2004 |
| WO | 2019129691 | 7/2019 |

OTHER PUBLICATIONS

Gao, et al., "Synthesis of unsaturated Fluoro-polyester resins and their UV curing properties," Yingyong Huaxue (2004), 21(1), 84-86 (2 pages).
"International Preliminary Report on Patentability," for PCT Application No. PCT/EP2018/086523 dated Jun. 30, 2020 (7 pages).
"International Search Report and Written Opinion," for PCT Application No. PCT/EP2018/086523 dated Mar. 13, 2019 (13 pages).
Pilati, F. et al., "Unsaturated Polyester Resins Modified with Perfluoropolyethers," J. Applied Pol. Sci. (1998); 67; 1679-1691 (13 pages).

* cited by examiner

*Primary Examiner* — Christopher M Rodd
(74) *Attorney, Agent, or Firm* — Pauly, DeVries Smith & Deffner LLC

(57) ABSTRACT

The embodiments herein relate to a fluorinated ether polymer which is capable of forming coatings with stain resistance, anti-fingerprint and anti-scratching properties. The polymer may be cured with multiple measures, therefore it has a variety of applications in coating and ink industry. The fluorinated ether polymers of the embodiments herein may be added into coating formulations to decrease the surface energy of resulting coatings. It is also feasible that the fluorinated ether polymers of the embodiments herein are used as the main resin component in coating formulations. The embodiments herein also relates to a method for manufacturing the polyester resin, and the use of the polyester resin in industries.

11 Claims, 5 Drawing Sheets

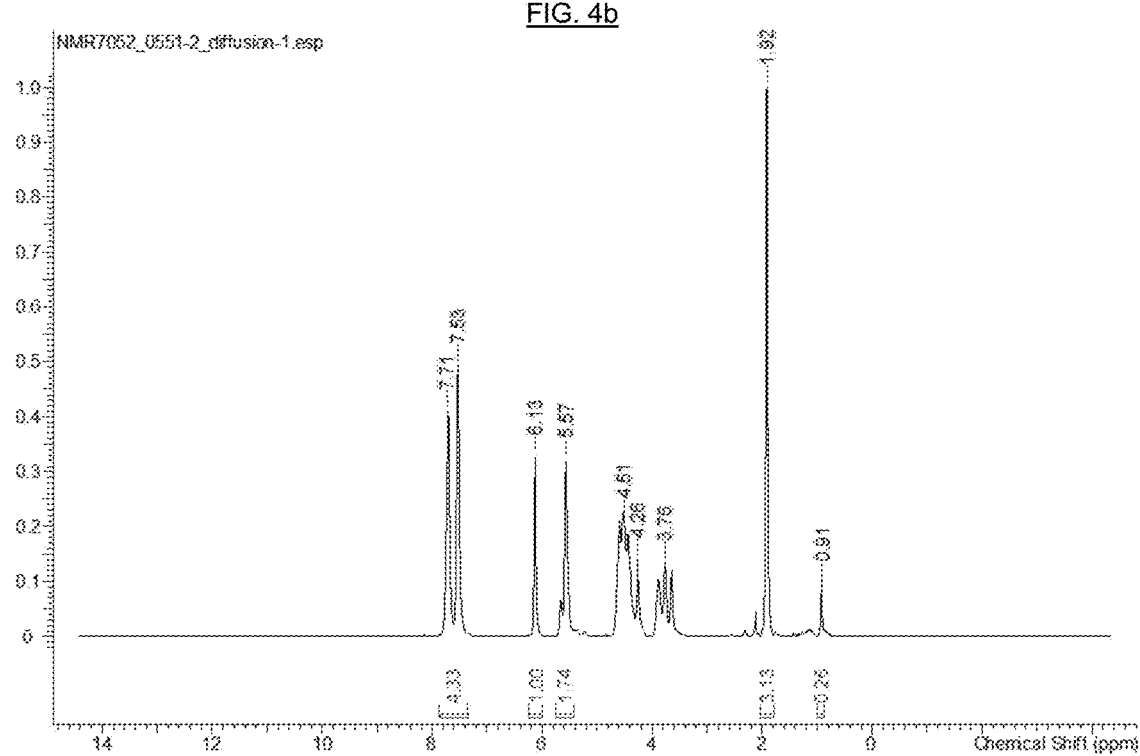

(a) UV resin (b) UV resin+1 wt% fluorinated resin

FLUORINATED ETHER POLYMER, THE PREPARATION METHOD THEREFORE AND USE THEREOF

CROSS REFERENCE TO RELATED APPLICATION(S)

This application is a national stage application under 35 U.S.C. 371 of International Patent Application Serial No. PCT/EP2018/086523, entitled "A FLUORINATED ETHER POLYMER, THE PREPARATION METHOD THEREFORE AND USE THEREOF," filed Dec. 21, 2018, which claims priority from CN2017/118492, filed on Dec. 26, 2017 and EP Application No. EP18165713.1, filed Apr. 4, 2018, the disclosures of which are hereby incorporated by reference herein in their entirety."

FIELD OF TECHNOLOGY

The embodiments herein relate to a polyester resin modified with perfluoropolyether. It is based on a dual-curing mechanism and capable of forming coatings with stain resistance, anti-fingerprint and anti-scratching properties. The embodiments herein also relate to a method for manufacturing the polyester resin, and the use of the polyester resin in industries.

BACKGROUND

The industry of 3C (Computer, Communications, and Consumer electronics) has been developing rapidly in recent years. Various electronic apparatuses such as cell phones, personal and industrial computers, digital assistants, cameras, automotive interiors etc., have been widely used in the modern society. While enjoining multiple functions of various 3C products, consumers are willing to keep as clean surface as possible of electronic apparatuses. As an example, smartphones are frequently operated by screen touch and in most situations hold by hand. The surface of smartphones is easily stained with cosmetics, fingerprints, oil that exists on human face, etc. The stains not only affect the appearance of smartphones, but also create a breeding environment for bacteria and other pathogens. The situation is similar for other electronic apparatuses. To prevent stain related problems, 3C products are usually required to have a coating with anti-stain and anti-fingerprint performances.

As an approach to increase the anti-stain and anti-fingerprint performances of the surface of 3C products, coatings that have hydrophobic and oleophobic characteristics have been applied on 3C products, to keep the surface energy at a low level and thus to prevent stains and fingerprints from being adhered to the coated surface of 3C products. Fluorine containing compounds have been known to have low surface energy and suitable for use in coatings. For instance, the surface energy of polytetrafluoroethylene is about 20 mN/m, and the surface energy of fluorocarbon ($—CF_3$) is less than 10 mN/m. By virtue of the low surface energy, fluorine resins and fluorine-containing surfactants have been used in coating formulations to improve the performance of resulting coatings, such as levelling property, water/oil repellence, anti-stain property and so on.

When used in coating formulations, however, as fluorine containing compounds are normally incompatible with most of resins used in the industry, they need to be modified by grafting chemical groups into the fluorine containing structure, to increase the compatibility with different resins. The grafted groups play an important role not only to improve compatibility of the modified structure with matrix resins, but also to introduce additional reactive groups into the modified structure, such as double bonds, hydroxyl groups, amine groups, etc.

Patent application CA679907A disclosed an unsaturated polyester resin prepared by reacting a fluorinated dihydric alcohol having the formula $(CF_2)_n—(CH_2OH)_2$, and a polycarboxylic compound containing aliphatic carbon-to-carbon unsaturation double bonds, the resin is curable under ultraviolet light. Patent application EP2277962 A1 disclosed an ultraviolet light curable resin containing a fluorine structure to improve water/oil repellency. The fluorine structure is perfluoropolyether (PFPE) containing two reaction groups at both ends of the molecular chain, represented by the formula R-PFPE-R, wherein R is selected from hydroxyl group, carboxyl group, isocyanate group, epoxy group, etc., in order for grafting carbon-to-carbon unsaturation double bonds into the perfluoropolyether molecular chain.

According to the state of the art, fluorinated polymers are normally based on a single curing mechanism. They are cured by either exposing to ultraviolet light, high temperature or curing agent, and do not support a dual curing mechanism. Moreover, most of the preparation processes of fluorinated polymers are conducted in a monotonous way, which makes it difficult to commercialize the processes under industrial scale. To facilitate the production and application of fluorinated polymers, there have been requirements to develop fluorinated polymers supporting dual-curing system and capable of forming coatings with both stain resistance and anti-scratching properties. There have also been demands for efficient and economic process of manufacturing such fluorinated polymers.

SUMMARY

In an embodiment, a fluorinated ether polymer is provided having one of the following structures (I) to (VIII),

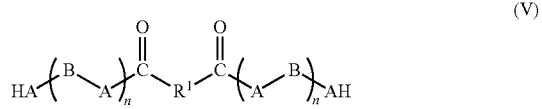

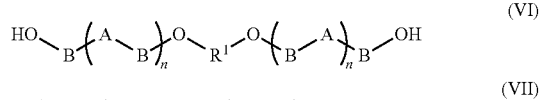

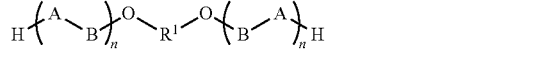

-continued

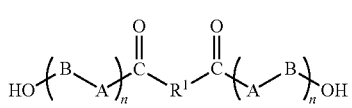
(VIII)

wherein A is a functional group that contains the following structure:

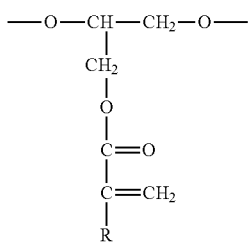

R = H or CH3

B is a functional group that contains one of the following structures:

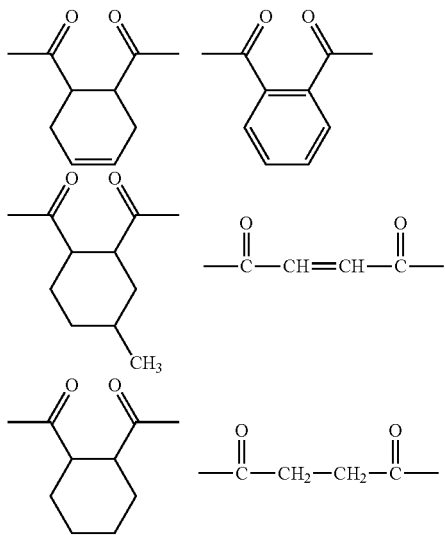

n is an integer, on average, ranging from 1 to 50,
$R^f$ is a functional group derived from a perfluoropolyether containing a carboxyl group at one end of its molecular chain, a perfluoropolyether containing carboxyl groups at both ends of its molecular chain, a perfluoropolyether containing a hydroxyl group at one end of its molecular chain, or a perfluoropolyether containing hydroxyl groups at both ends of its molecular chain, the average molecular weight of perfluoropolyether being from 500 to 4000.

In an embodiment, n is an integer, on average, ranging from 10 to 30.

In an embodiment, wherein the number average molecular weight of $R^f$ is from 1000 to 3000.

In an embodiment, wherein $R^f$ is derived from
F(CFCF$_3$CF$_2$O)$_n$CFCF$_3$COOH,
F(CFCF$_3$CF$_2$O)$_n$CFCF$_3$CH$_2$OH,
HO(CH$_2$CH$_2$O)$_m$CH$_2$CF$_2$O(CF$_2$CF$_2$O)$_p$(CF$_2$O)$_q$CF$_2$CH$_2$(OCH$_2$CH$_2$)$_m$OH
HOCH$_2$CF$_2$O(CF$_2$CF$_2$O)$_p$(CF2O)$_q$CF$_2$CH$_2$OH
HOOCCF$_3$FC(CFCF$_3$CF$_2$O)$_n$CFCF$_3$COOH
F(CF$_2$CF$_2$O)$_n$CFCF$_3$COOH
HOOCCFCF$_3$(CF$_2$CF$_2$O)$_n$CFCF$_3$COOH
F(CF$_2$CF$_2$O)$_n$CF$_2$COOH
HOOCCF$_2$(CF$_2$CF$_2$O)$_n$CF$_2$COOH
F(CF$_2$CF$_2$OCF$_2$CF$_2$CF$_2$O)$_n$CF$_2$COOH
HOOCC F$_2$ (CF$_2$CF$_2$OCF$_2$CF$_2$CF$_2$O)$_n$CF$_2$COOH
HOOCCH$_2$CF$_2$O(CF$_2$CF$_2$O)$_m$(CF$_2$O)$_n$CF$_2$CH$_2$COOH
CF$_3$O(CF$_2$CF$_2$O)$_m$(CF$_2$O)$_n$CF$_2$CH$_2$COOH
HOOC(OCH$_2$CH$_2$)$_n$CH$_2$CF$_2$O(CF$_2$CF$_2$O)$_m$(CF$_2$O)nCF$_2$CH$_2$(OCH$_2$CH$_2$)$_n$COOH
CF$_3$O(CF$_2$CF$_2$O)$_m$(CF$_2$O)$_n$CF$_2$CH$_2$(OCH$_2$CH$_2$)$_n$COOH
F(CFCF$_3$CF$_2$O)$_n$CFCF$_3$CH$_2$OH
HOCH$_2$CF$_3$FC(CFCF$_3$CF$_2$O)$_n$CFCF$_3$CH$_2$OH
F(CF$_2$CF$_2$O)$_n$CFCF$_3$CH$_2$OH
HOC H$_2$CFCF$_3$(CF$_2$CF$_2$O)$_n$CFCF$_3$CH$_2$OH
F(CF$_2$CF$_2$O)$_n$CF$_2$CH$_2$OH
HOC H$_2$CF$_2$(CF$_2$CF$_2$O)$_n$CF$_2$CH$_2$OH
F(CF$_2$CF$_2$OCF$_2$CF$_2$CF$_2$O)$_n$CF$_2$CH$_2$OH
HOC H$_2$C F$_2$ (CF$_2$CF$_2$OCF$_2$CF$_2$CF$_2$O)$_n$CF$_2$CH$_2$OH
HOC H$_2$CH$_2$CF$_2$O(CF$_2$CF$_2$O)$_m$(CF$_2$O)$_n$CF$_2$CH$_2$CH$_2$OH
CF$_3$O(CF$_2$CF$_2$O)$_m$(CF$_2$O)$_n$CF$_2$CH$_2$CH$_2$OH
HOC H$_2$(OCH$_2$CH$_2$)$_n$CH$_2$CF$_2$O(CF$_2$CF$_2$O)$_m$(CF$_2$O)$_n$CF$_2$CH$_2$(OCH$_2$CH$_2$)$_n$CH$_2$OH, or
CF$_3$O(CF$_2$CF$_2$O)$_m$(CF$_2$O)$_n$CF$_2$CH$_2$(OCH$_2$CH$_2$)$_n$CH$_2$OH
wherein m, n, p, q are integers, and on average, independently ranging from 1 to 50.

In an embodiment, wherein the number average molecular weight of the fluorinated ether polymer is from 1000 to 100000.

In an embodiment, wherein the number average molecular weight of the fluorinated ether polymer is from 2000 to 5000.

In an embodiment, a method for preparing a fluorinated ether polymer, is included. The method includes: a) mixing a perfluoropolyether containing $R^f$, monomers that are capable of forming structures A and B according to claim 1, and an inhibitor that stabilizes carbon double bonds; b) heating the mixture to a temperature ranging from 90 to 120° C., and c) maintaining the temperature for 2 to 5 hours.

In an embodiment, wherein the molar ratio of perfluoropolyether containing $R^f$, monomer that is capable of forming structure A, and monomer that is capable of forming structure B is 1:1-15:1-15.

In an embodiment, wherein the molar ratio of perfluoropolyether containing $R^f$, monomer that is capable of forming structure A, and monomer that is capable of forming structure B is 1:5-10:5-10.

In an embodiment, a method of using a fluorinated ether polymer to form a coating onto a substrate, can include applying and then curing the fluorinated ether polymer on the substrate.

In an embodiment, a coating composition is provided which contains a fluorinated ether polymer that can include one of the following structures (I) to (VIII),

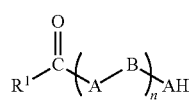
(I)

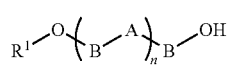
(II)

-continued

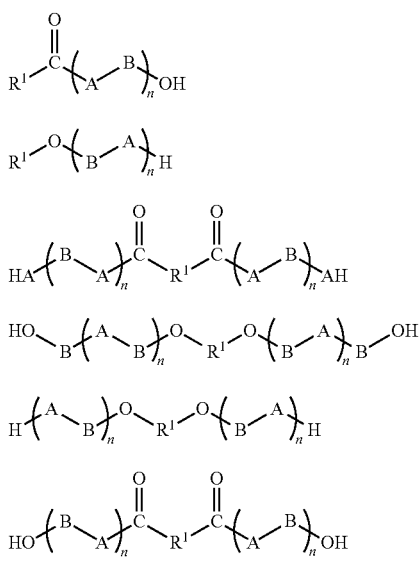

wherein A is a functional group that contains the following structure:

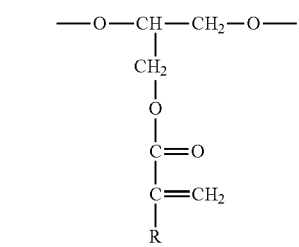

R = H or CH₃

B is a functional group that contains one of the following structures:

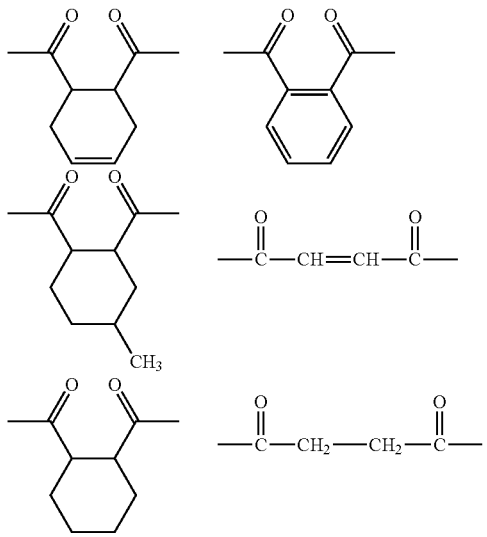

n is an integer, on average, ranging from 1 to 50,
R^f is a functional group derived from a perfluoropolyether containing a carboxyl group at one end of its molecular chain, a perfluoropolyether containing carboxyl groups at both ends of its molecular chain, a perfluoropolyether containing a hydroxyl group at one end of its molecular chain, or a perfluoropolyether containing hydroxyl groups at both ends of its molecular chain, the average molecular weight of perfluoropolyether being from 500 to 4000.

The embodiments herein provide for a fluorinated ether polymer which is based on a dual-curing mechanism and capable of forming coatings with stain resistance, anti-fingerprint and anti-scratching properties. The fluorinated polymer according to the embodiments herein may be cured by both ultraviolet radiation and/or curing agents, to form a hard coating with satisfying anti-stain and anti-scratch properties.

DETAILED DESCRIPTION

In one aspect of the embodiments herein, fluorinated ether polymers having the following structures (I) to (VIII) are provided.

 (I)

 (II)

 (III)

 (IV)

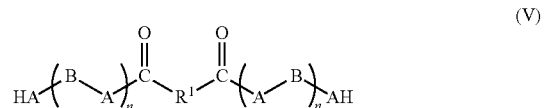 (V)

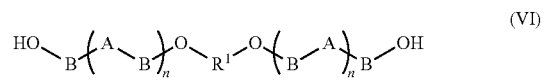 (VI)

 (VII)

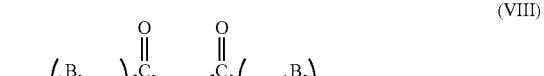 (VIII)

wherein

A is a functional group that contains the following structure:

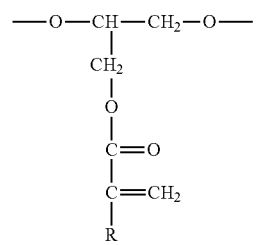

R = H or CH₃

The above structure A can be obtained via different reaction mechanisms that are known in the art, including, but not limited to, ring opening reaction of an epoxy compound that has unsaturated double bonds, oxidation reaction of a diol that has unsaturated double bonds, etc. Specifically, the above structure according to the embodiments herein is prepared from substituted or unsubstituted α,β-unsaturated carboxylic acid epoxy esters.

B is a functional group that contains a structure selected from the following structures:

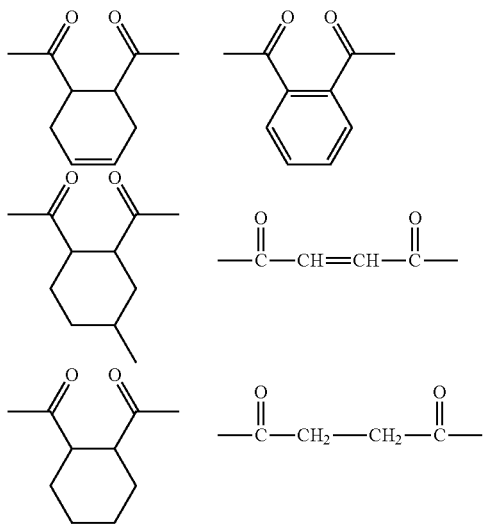

The above structures B can be obtained via different reaction mechanisms that are known in the art, including, but not limited to, hydrolysis reaction of an anhydride, dehydroxylation reaction of a dicarboxylic acid. Specifically, the above structures according to the embodiments herein are prepared from substituted and unsubstituted cycloanhydrides or succinic anhydrides, for example, phthalic anhydride, hexahydrophthalic anhydride, tetrahydrophthalic anhydride, and malic anhydride.

n is an integer, on average, ranging from 1 to 50, or from 10 to 30.

$R^f$ is a functional group derived from a perfluoropolyether containing a carboxyl group at one end of its molecular chain, a perfluoropolyether containing carboxyl groups at both ends of its molecular chain, a perfluoropolyether containing a hydroxyl group at one end of its molecular chain, or a perfluoropolyether containing hydroxyl groups at both ends of its molecular chain. The number average molecular weight of perfluoropolyether is from 500 to 4000, or from 1000 to 3000, as measured by Gel permeation chromatography (GPC) with commercially available apparatus named Agilent 1200.

Specifically, $R^f$ according to the embodiments herein is derived from $F(CFCF_3CF_2O)_nCFCF_3COOH$,
$F(CFCF_3CF_2O)_nCFCF_3CH_2OH$,
$HO(CH_2CH_2O)_mCH_2CF_2O(CF_2CF_2O)_p(CF_2O)_qCF_2CH_2(OCH_2CH_2)_mOH$
$HOCH_2CF_2O(CF_2CF_2O)_p(CF_2O)_qCF_2CH_2OH$
$HOOCCF_3FC(CFCF_3CF_2O)_nCFCF_3COOH$
$F(CF_2CF_2O)_nCFCF_3COOH$
$HOOCCFCF_3(CF_2CF_2O)_nCFCF_3COOH$
$F(CF_2CF_2O)_nCF_2COOH$
$HOOCCF_2(CF_2CF_2O)_nCF_2COOH$
$F(CF_2CF_2OCF_2CF_2CF_2O)_nCF_2COOH$
$HOOCC F_2(CF_2CF_2OCF_2CF_2CF_2O)_nCF_2COOH$
$HOOCCH_2CF_2O(CF_2CF_2O)_m(CF_2O)_nCF_2CH_2COOH$
$CF_3O(CF_2CF_2O)_m(CF_2O)_nCF_2CH_2COOH$
$HOOC(OCH_2CH_2)_nCH_2CF_2O(CF_2CF_2O)_m(CF_2O)_nCF_2CH_2(OCH_2CH_2)_nCOOH$
$CF_3O(CF_2CF_2O)_m(CF_2O)_nCF_2CH_2(OCH_2CH_2)_nCOOH$
$F(CFCF_3CF_2O)_nCFCF_3CH_2OH$
$HOCH_2CF_3FC(CFCF_3CF_2O)_nCFCF_3CH_2OH$
$F(CF_2CF_2O)_nCFCF_3CH_2OH$
$HOC H_2CFCF_3(CF_2CF_2O)_nCFCF_3CH_2OH$
$F(CF_2CF_2O)_nCF_2CH_2OH$
$HOC H_2CF_2(CF_2CF_2O)_nCF_2CH_2OH$
$F(CF_2CF_2OCF_2CF_2CF_2O)_nCF_2CH_2OH$
$HOC H_2C F_2 (CF_2CF_2OCF_2CF_2CF_2O)_nCF_2CH_2OH$
$HOC H_2CH_2CF_2O(CF_2CF_2O)_m(CF_2O)_nCF_2CH_2CH_2OH$
$CF_3O(CF_2CF_2O)_m(CF_2O)_nCF_2CH_2CH_2OH$
$HOC H_2(OCH_2CH_2)_nCH_2CF_2O(CF_2CF_2O)_m(CF_2O)_nCF_2CH_2(OCH_2CH_2)_nCH_2OH$, or
$CF_3O(CF_2CF_2O)_m(CF_2O)_nCF_2CH_2(OCH_2CH_2)_nCH_2OH$ wherein m, n, p, q are integers, and on average, independently ranging from 1 to 50.

$R^1$ is derived from
$F(CFCF_3CF_2O)_nCFCF_3COOH$,
$F(CFCF_3CF_2O)_nCFCF_3CH_2OH$,
$HO(CH_2CH_2O)_mCH_2CF_2O(CF_2CF_2O)_p(CF_2O)_qCF_2CH_2(OCH_2CH_2)_mOH$, or
$HOCH_2CF_2O(CF_2CF_2O)_p(CF_2O)_qCF_2CH_2OH$ wherein m, p, q are integers, and on average, m is ranging from 1 to 50, p and q are independently ranging from 1 to 5.

The number average molecular weight of the fluorinated ether polymer of the embodiments herein is normally from 1000 to 100000, or from 2000 to 5000, as measured by Gel permeation chromatography (GPC) with commercially available apparatus named Agilent 1200.

In another aspect of the embodiments herein, a method for preparing the aforementioned fluorinated ether polymers having the structures (I) to (VIII) is provided.

Perfluoropolyether suitable for use as a starting material in the embodiments herein has carboxyl group or hydroxyl group at one or both ends of its molecular chain. The functional groups may react with either a precursor of the functional group A or a precursor of the functional group B, and then gradually initiate the condensation polymerization between the precursors of A and B. When used herein, the term "precursor of the functional group A" is meant to be monomers that are capable of forming structure A via a reaction mechanism known in the art, as discussed in the previous context. Similarly, the term "precursor of the functional group B" is meant to be monomers that are capable of forming structure B via a reaction mechanism known in the art. For the sake of simplicity, in the following context the two terms will be referred to as "precursor A" and "precursor B," respectively, and perfluoropolyether containing $R^f$ functional group will be briefly referred to as $R^f$.

The synthesis process of fluorinated ether compounds according to the embodiments herein mainly comprises:

a) mixing $R^f$, precursors A and B, and an inhibitor that stabilizes carbon-carbon double bonds;

b) heating the mixture to a temperature ranging from 90 to 120° C., and c) maintaining the temperature for 2 to 5 hours.

There is no special requirement regarding the inhibitor used in the synthesis process of the embodiments herein. Any type of polymerization inhibitor that has been known to stabilize carbon-carbon double bonds may be used in the process of the embodiments herein as the inhibitor. A suitable inhibitor may be selected from butylated hydroxytoluene (BHT), benzoquinone, and 4-tert-butylcatechol (TBC).

Catalyst may be added to facilitate the reaction process and to reduce the reaction time, including, but not limited to stannic catalysts.

A solvent that is capable of solubilizing the fluorinated ether compounds according to the embodiments herein and does not disturb reaction of the components may be optionally added in step a), such that the reaction components are fully contacted with each other. Suitable solvent may be selected from, but not limited to, methyl isobutyl ketone (MIBK), butyl acetate (BAC), xylene, toluene, etc. One of ordinary skill in the art may select other proper solvents in view of actual requirements.

The functional groups contained in $R^f$ are carboxyl groups and/or hydroxyl groups. They may react with epoxy group of precursor A, or cycloanhydride group of precursor B. The selectivity between precursor A and precursor B normally depends on the functional group of $R^f$ at the chain end. If the functional group at the chain end of $R^f$ is carboxyl group, it reacts with precursor A first, and then with precursor B. If the functional group at the chain end of $R^f$ is hydroxyl group, it reacts with precursor B first, and then with precursor A.

It has been found that the acid value of the reaction mixture was a key factor affecting the structure of resulted copolymer, and that the end unit of molecular chain could be controlled by the feeding mole ratio between precursors A and B. When the feeding mole quantity of precursor A is bigger than B, $R^f$ has carboxyl groups, and the acid value is controlled to be less than 5, the resulting copolymer mainly has A as the end unit of its molecular chain; When the feeding mole quantity of A is much less than B, and the acid value is controlled by reaction degree, the resulting copolymer mainly has B as the end unit of its molecular chain. Specifically, the molar ratio of perfluoropolyether $R^f$, precursor A, and precursor B is 1:1~15:1~15, or 1:5~10:5~10.

When the acid value is controlled to be within a range from 0 to 5, the resulting copolymer has A as the end unit of its molecular chain. When the acid value is controlled to be bigger than 40, the resulting copolymer has B as the end unit of its molecular chain. When the acid value is controlled to be ranging from 5 to 40, the resulting copolymer has both A and B as the end unit of its molecular chain.

Furthermore, depending on whether $R^f$ contains functional groups at one end or both ends of its molecular chain, different copolymer structures may be prepared. When $R^f$ containing functional group at one end of its molecular chain is used as material, the resulting copolymer has repeat units being connected at one end of $R^f$; when $R^f$ containing functional groups at both ends of its molecular chain is used as material, the resulting copolymer has repeat units being connected at both ends of $R^f$.

In another aspect of the embodiments herein, compositions and applications of the fluorinated ether polymers are provided.

The fluorinated ether polymers of the embodiments herein may be added into coating formulations to decrease the surface energy of resulting coatings. It is also feasible that the fluorinated ether polymers of the embodiments herein are used as the main resin component in coating formulations. Thus there are provided coating compositions that contain one or more of the fluorinated ether polymers according to the embodiments herein.

The perfluoropolyether chain of the fluorinated ether polymers tends to gather and distribute on the surface of resulting coatings by affection of surface tension. Due to the low surface energy nature of the perfluoropolyether chain, the surface of resulting coatings show excellent anti-stain properties such as oil repellence, fingerprint removability, as well as lubricity. Moreover, due to the low surface energy introduced by the fluorinated ether polymers of the embodiments herein, levelling effect of the resulting coatings has been found to be improved as well. Thus the fluorinated ether polymer of the embodiments herein is suitable for use in both solvent based and water based coating formulations.

The fluorinated ether polymer according to the embodiments herein has hydroxyl groups and unsaturated double bonds as functional groups. It is capable of being cured with multiple measures including ultraviolet light radiation, reaction with a curing agent such as isocyanate, amine, phenolic resin and heating etc. Therefore, the fluorinated ether polymer of the embodiments herein has a variety of applications in coating and ink industry, either mixed with other resins or singly, to improve anti-staining, antifouling, anti-fingerprint, lubrication properties of resulting coatings. For instance, it may be mixed with ultraviolet light curable resin, polyurethane resin, amine resin, hydroxyl group resin, amine resin, phenolic resin, etc., to formulate a film-forming coating composition. In these systems, the fluorinated polymer of the embodiments herein works as either an additive or a main resin.

Coatings that contain fluorinated ether polymers of the embodiments herein are mainly used in, for example, consumer electronic devices, automotive, aerospace devices, packaging and coil and marine devices. Specifically, the devices include but are not limited to mobile phones, tablets, personal computers, laptop computers, electronic readers, music players, computer accessories (monitors, mouse, keyboards, portable hard disks, and printers), televisions, game consoles, global positioning system devices, wearable devices, and the like. Other applications include automotive interior and exterior parts, and home appliances.

BRIEF DESCRIPTION OF THE FIGURES

The above and other objectives, features and advantages of the embodiments herein will become more apparent to those of ordinary skill in the art by describing the embodiments thereof with reference to the accompanying drawings.

FIGS. 4a and 4b show NMR of sample 5 and sample 6, respectively;

EXAMPLES

The embodiments herein will be elucidated with reference to the following examples.

Raw Material

Perfluoropolyether (PFPE), glycidyl methacrylate (GMA), glycidyl acrylate (GA), phthalic anhydride (PA), hexahydrophthalic anhydride (HHPA), tetrahydrophthalic anhydride (THPA) and malic anhydride (MAH). PFPE with a carboxyl group at one end of its molecular chain is available from Chemours. PFPE with a hydroxyl group at one end of its molecular chain is available from Sinochem. PFPE with hydroxyl groups at both ends of its molecular chain is available from Solvay. The others are commonly available chemicals. Analytical grade or industrial grade chemicals can be used as materials according to the embodiments herein. Methyl isobutyl ketone (MIBK) is used as solvent.

Example 1

45.4 g $R^f$ with carboxyl group at one end of its molecular chain was mixed with 22.4 g PA, 32.2 g GMA, 60 g MIBK and 0.1% BHT in a 250 ml reactor and heated up to 100° C. within 60 minutes with stirring. The whole system was kept at 100° C. till the acid value of the resultant product decreased down to 10. The system was then cooled down to room temperature and diluted to an application solid content of 40 wt. % with solvent MIBK. The obtained fluorinated polymer is sample 1.

Gel permeation chromatography (GPC) of the prepared fluorinated polymer was measured with a commercially available measuring apparatus named Agilent 1200. The fluorinated polymer was diluted in tetrahydrofuran (THF) solvent to 0.1 wt. % and passed through 0.5 μm filter. The molecular weight of the fluorinated polymer was measured accordingly.

Figure 1:
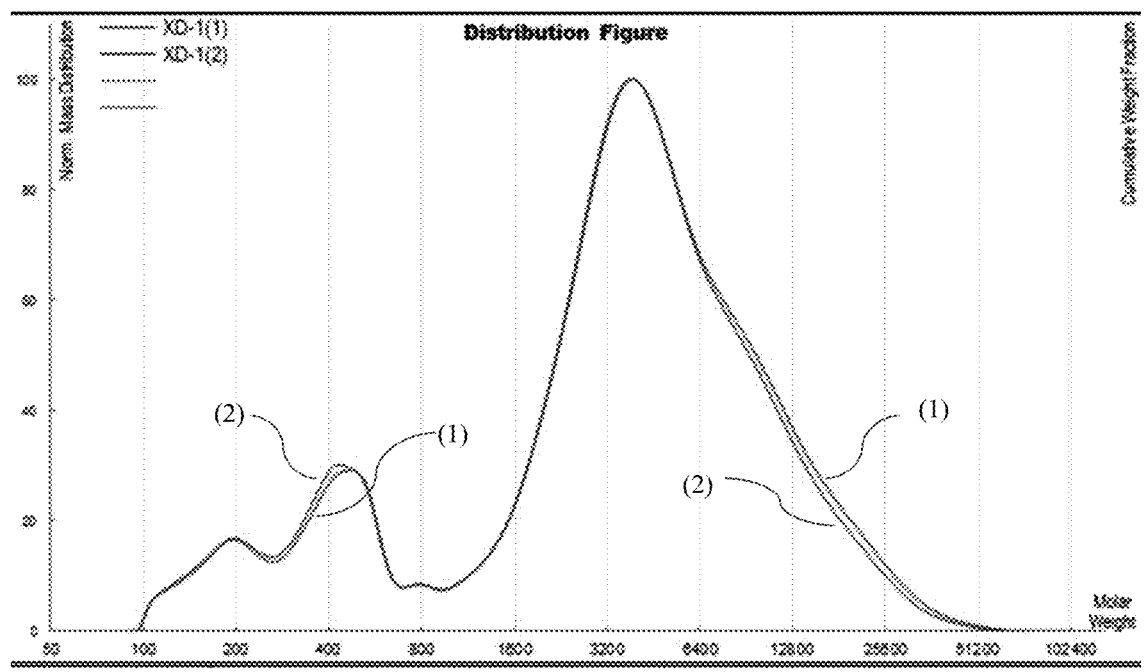
FIG. 1 shows the GPC spectrum of obtained fluorinated polymers, wherein sample 1 and sample 2 are marked as lines (1) and (2), respectively.

The GPC spectrum of sample 1 is shown as line (1) in FIG. 1.

Example 2

69.8 g $R^f$ with hydroxyl group at one end of its molecular chain was mixed with 10.3 g PA, 19.8 g GMA, 60 g MIBK and 0.1% BHT in a 250 ml reactor and heated up to 100° C. within 60 minutes with stirring. The whole system was kept at 100° C. till the acid value of the resultant product decreased down to 8. The system was then cooled down to room temperature and diluted to an application solid content of 40 wt. % with solvent MIBK. The obtained fluorinated polymer is sample 2.

Gel permeation chromatography (GPC) of the prepared fluorinated polymer was measured with the same apparatus and method as described in example 1.

The GPC spectrum of sample 2 is shown as line (2) in FIG. 1.

Example 3

16.2 g $R^f$ with carboxyl group at one end of its molecular chain was mixed with 41.6 g HHPA, 42.2 g GMA, 80 g MIBK and 0.1% BHT in a 250 ml reactor and heated up to 100° C. within 60 minutes with stirring. The whole system was kept at 100° C. till the acid value of the resultant product decreased down to 10. The system was then cooled down to room temperature and diluted to an application solid content of 35 wt. % with solvent MIBK. The obtained fluorinated polymer is sample 3.

FtIR spectra of the prepared fluorinated polymer was obtained at a resolution of 4 cm$^{-1}$ using a PerkinElmer Spectrum 100 FTIR Spectrometer with ATR sampling accessory. The wave-number range was set from 4000 to 450 cm$^{-1}$. 32 scans were averaged to reduce noise.

Figure 2:
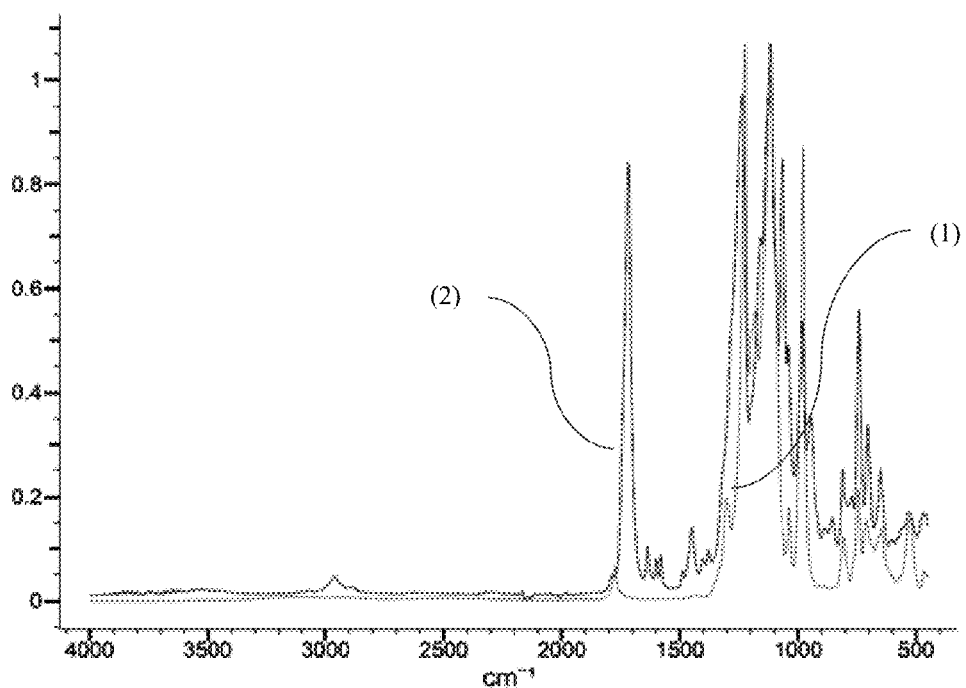
FIG. 2 shows FtIR of $R^f$ for comparison and sample 3, marked as lines (1) and (2), respectively.

The FtIR spectrum of sample 3 is shown in FIG. 2, together with the spectrum of $R^f$ as a standard curve for comparison. It can be seen that most of the characteristic peaks from 1500 to 500 cm$^{-1}$ are significantly overlapping between the curves of sample 3 and $R^f$.

Example 4

25.3 g $R^f$ with hydroxyl group on both ends of its molecular chain was mixed with 38.9 g HHPA, 35.92 g GMA, 70 g MIBK and 0.1% BHT in a 250 ml reactor and heated up to 100° C. within 60 minutes with stirring. The whole system was kept at this temperature till the acid value of the resultant product decreased down to 10. The system was then cooled down to room temperature and diluted to an application solid content of 35 wt. % with solvent MIBK. The obtained fluorinated polymer is sample 4.

FtIR spectra of the prepared fluorinated polymer was obtained using the same apparatus and method as described in example 3.

Figure 3:
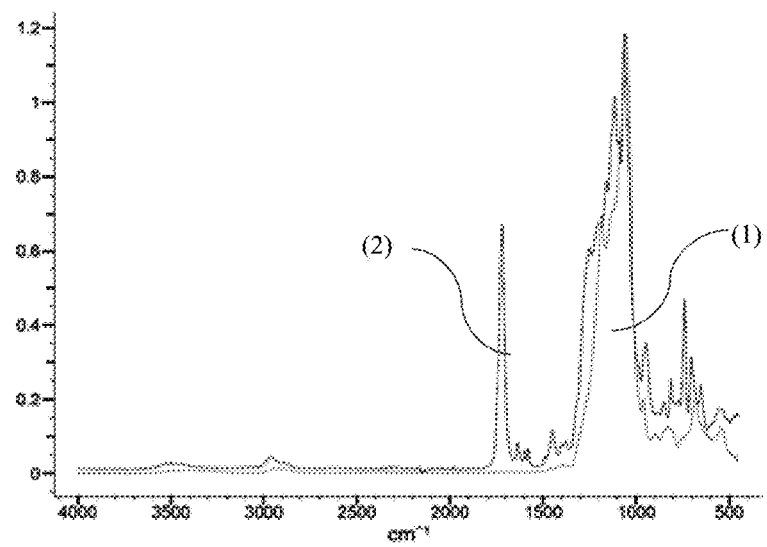
FIG. 3 shows FtIR of $R^f$ for comparison and sample 4, marked as lines (1) and (2), respectively.

The FtIR spectrum of sample 4 is shown in FIG. 3, together with the spectrum of $R^f$ as a standard curve for comparison. It can be seen that most of the characteristic peaks from 1500 to 500 cm$^{-1}$ are significantly overlapping between the curves of sample 4 and $R^f$.

Example 5

58.1 g $R^f$ with carboxyl group at one end of its molecular chain was mixed with 17.1 g MAH, 24.8 g GMA, 60 g MIBK and 0.1% BHT in a 250 ml reactor and heated up to 100° C. within 60 minutes with stirring. The whole system was kept at this temperature till the acid value of the resultant product decreased down to 20. The system was then cooled down to room temperature and diluted to an application solid content of 40 wt. % with solvent MIBK. The obtained fluorinated polymer is sample 5.

The sample was dissolved in a mixture solvent of CDCl$_3$ and DMSO, and measured with Nuclear Magnetic Resonance (NMR) spectroscopy. The NMR data was obtained in a 400 MHz NMR system using a 5 mm probe at room temperature. The sample was measured by means of 1D (1H, 13C) and 2D (COSY, HMQC) experiment.

Figure 4A:
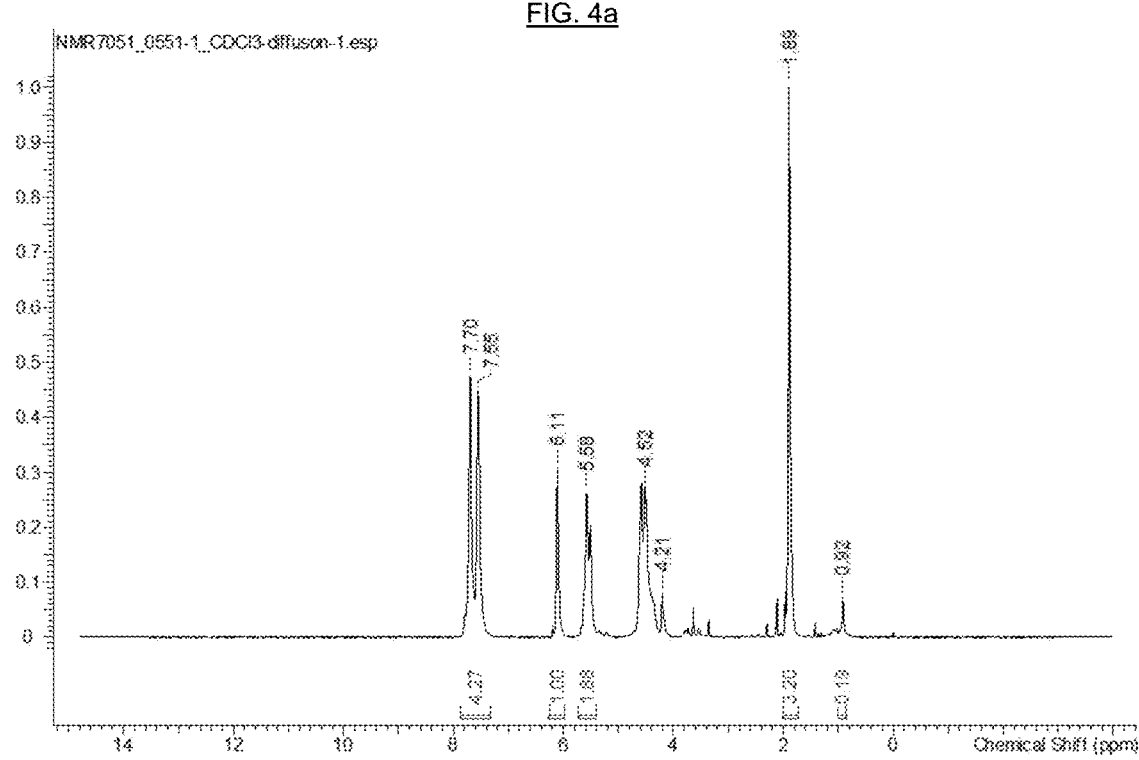

The NMR spectrum of sample 5 is shown in FIG. 4a. The intrinsic spectrum indicates that the synthesis of the resin was successful.

Example 6

53.4 g $R^f$ with carboxyl group on both ends of its molecular chain was mixed with 16.2 g THPA, 30.3 g GMA, 70 g MIBK and 0.1% BHT in a 250 ml reactor and heated up to 100° C. within 60 minutes with stirring. The whole system was kept at this temperature till the acid value of the resultant product decreased down to 10. The system was then cooled down to room temperature and diluted to an application solid content of 40 wt. % with solvent MIBK. The obtained fluorinated polymer is sample 6.

NMR data of the sample was obtained with the same apparatus and method as described in example 5.

The NMR spectrum of sample 6 is shown in FIG. 4b. The intrinsic spectrum indicates that the synthesis of the resin was successful.

Example 7—Formation of Hard Coatings

In this example, fluorinated polymers according to the embodiments herein were cured by its own, and mixed with other resins, to form a hard coating film.

The fluorinated polymer according to example 1 was applied onto a PC/ABS substrate, cured singly by being subject to a temperature above 150° C., and to ultraviolet light exposure, respectively. Clear coats were formed on the substrates accordingly.

Example 8—Liquid Contact Angle Test

Liquid contact angle tests were conducted for the fluorinated polymers of the embodiments herein. The water and oil contact angles of coating film surface were measured with a commercially available apparatus named Dataphysics OCA20/6.

Two samples of hard coating-forming polymers were prepared for comparison. One was a common UV resin (UX-8800WIBAC20, KAYAKU CHEMICAL(WUXI) CO., LTD), and the other one was a mixture of the common UV resin (UX-8800WIBAC20, KAYAKU CHEMICAL(WUXI) CO., LTD) and 1 wt. % of the fluorinated polymer of example 1. Both of the samples were applied onto PC/ABS substrates and cured by exposure to ultraviolet light.

Water contact angle was measured on top of the cured hard coatings, respectively, with Sessile drop method. The droplets were set as 3 μl/droplet, and the measurement temperature was about 20° C. The test results are shown in the table 1 below.

Oil contact angle tests were conducted similarly with the same method. The droplets were set as 2 μl/droplet, and the measurement temperature was about 20° C. The test results are shown in the table 1 below as well.

TABLE 1

The liquid contact angle of cured samples

| Resin | Water contact angle | Hexadecane contact angle |
|---|---|---|
| UV resin | 64.4° | <10° |
| UV resin + 1 wt % fluorinated resin | 111.1° | 71.1° |

Example 9—Oil-Based Ink Repellence Test

Oil-based ink repellence tests were conducted for the fluorinated polymers of the embodiments herein.

Two samples of hard coating-forming polymers were prepared for comparison. One was common UV resin (UX-8800WIBAC20, KAYAKU CHEMICAL(WUXI) CO., LTD), and the other one was a mixture of UV resin (UX-8800WIBAC20, KAYAKU CHEMICAL(WUXI) CO., LTD) and 1 wt. % of the fluorinated polymer of example 1. Both of the samples were applied onto PC/ABS substrates and cured by exposure to ultraviolet light.

Figure 5A:
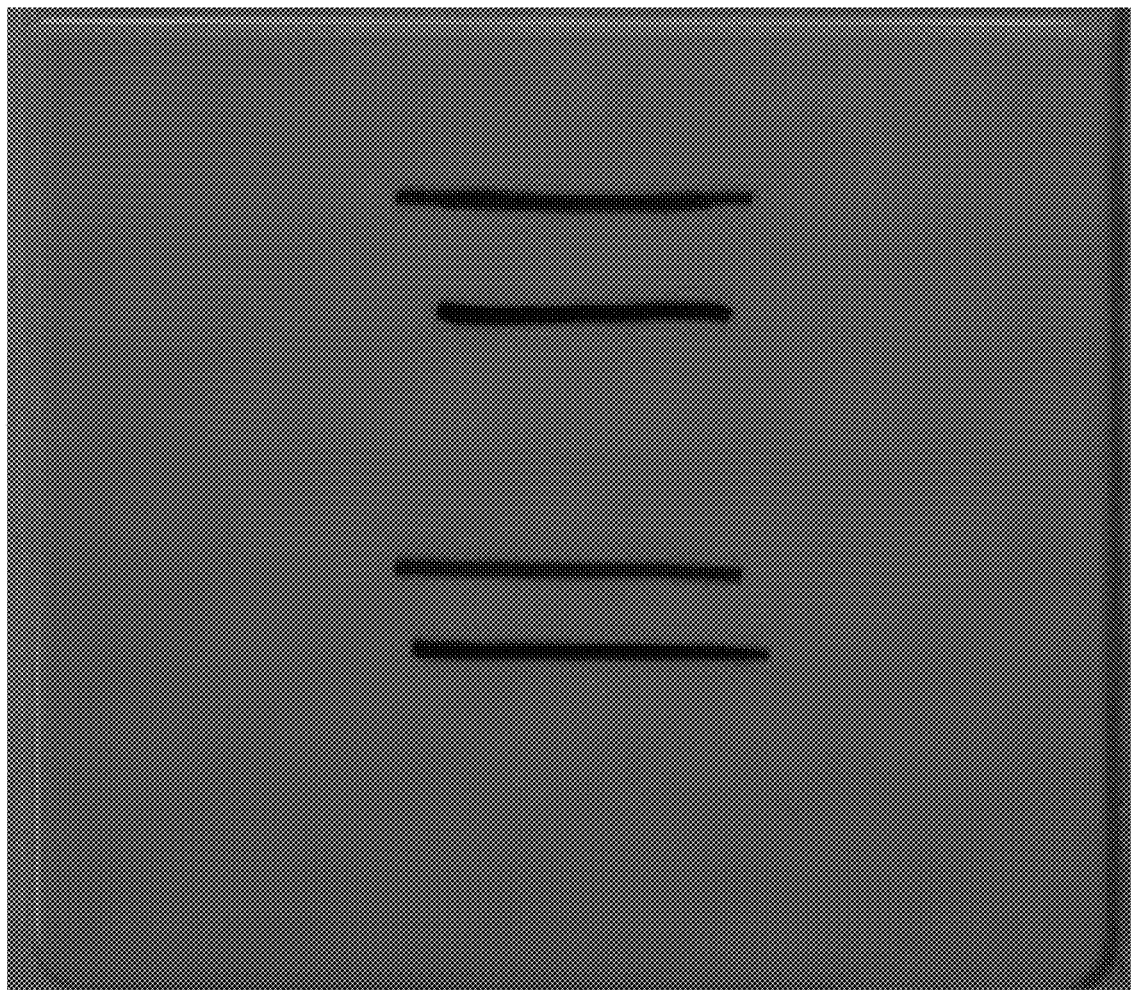
FIGS. 5a and 5b show stain repellence performance of coatings with and without fluorinated resin, respectively.
Figure 5B:
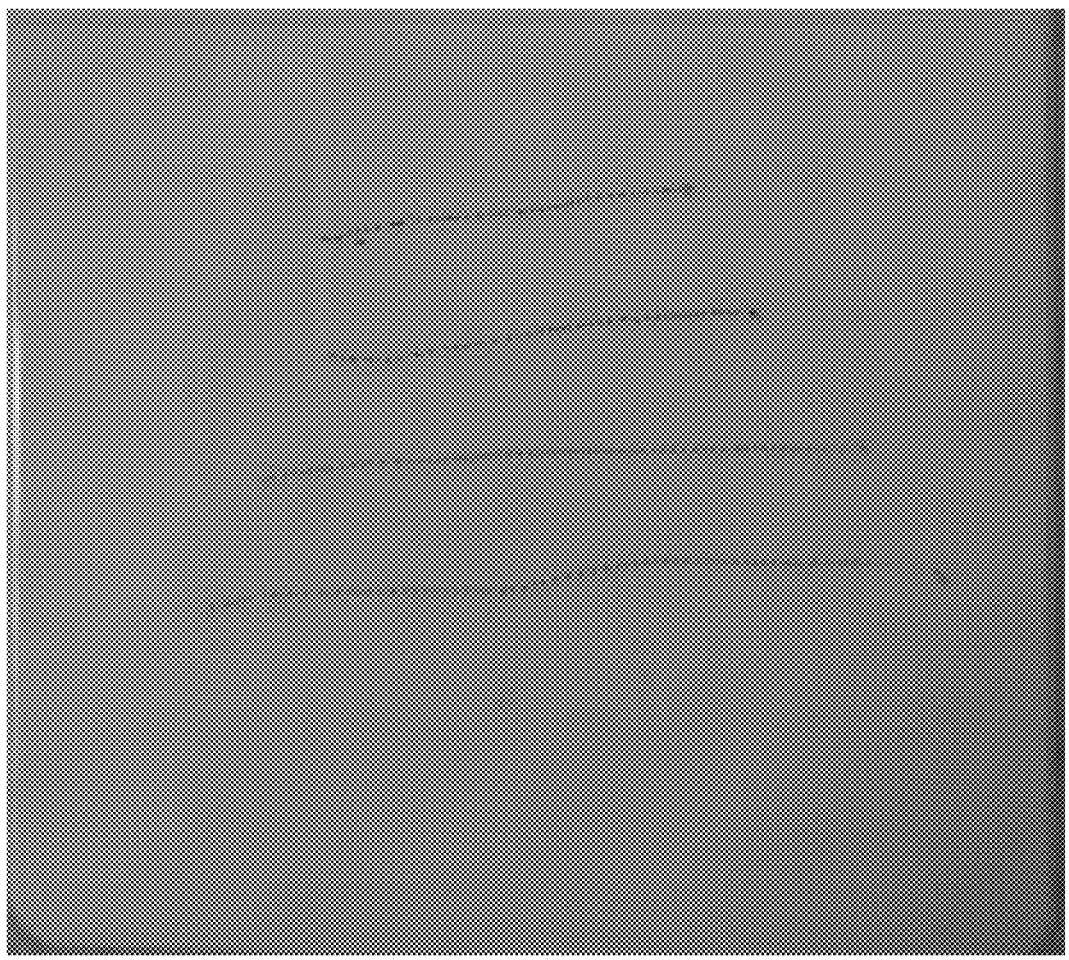

Pens with different colors of oil-based inks were used to write and draw on top of the cured hard coatings, respectively. Pictures were taken to show the different appearance of the inks wrote onto the hard coatings, see FIGS. 5a and 5b. It was seen that the inks wrote on the hard coating of the common UV resin were well spread and shown as regular lines, and that the inks wrote on the hard coating of the mixture of UV resin (UX-8800WIBAC20, KAYAKU CHEMICAL(WUXI) CO., LTD) and 1 wt. % of the fluorinated polymer were barely spread, while instead, shrank into small liquid beads, indicating that the latter coating surface has strong repellence to the oil-based inks. The oil-based inks wrote on the hard coating formed with the mixture of UV resin (UX-8800WIBAC20, KAYAKU CHEMICAL(WUXI) CO., LTD) and 1 wt. % of the fluorinated polymer were easily wiped off, with substantially no stain remains (not shown in the picture).

The invention claimed is:

1. A fluorinated ether polymer comprising one of the following structures (I) to (VIII),

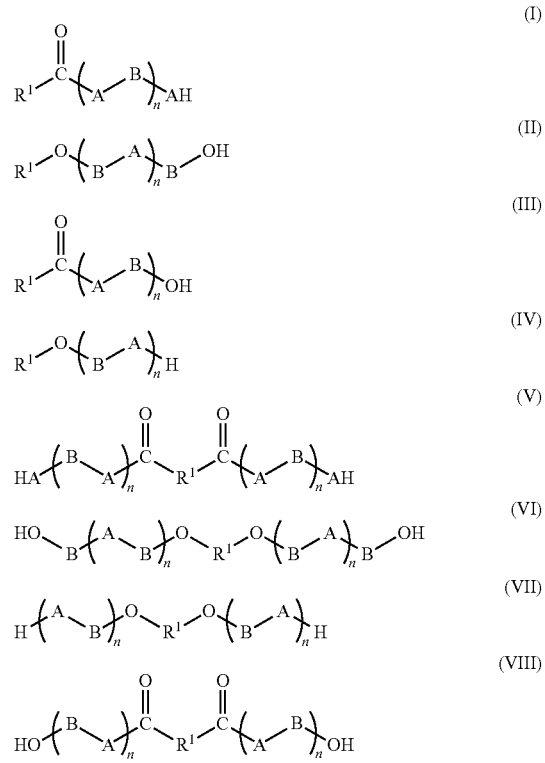

wherein A is a functional group comprising the following structure:

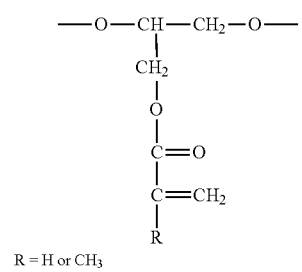

R = H or CH$_3$

B is a functional group comprising one of the following structures:

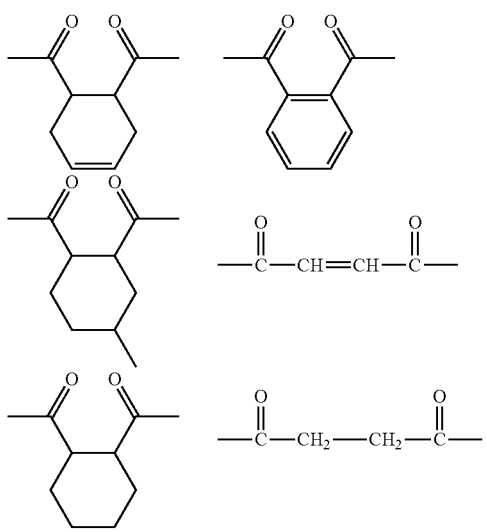

n is an integer, on average, ranging from 1 to 50;

$R^f$ is a functional group derived from a perfluoropolyether containing a carboxyl group at one end of its molecular chain, a perfluoropolyether containing carboxyl groups at both ends of its molecular chain, a perfluoropolyether containing a hydroxyl group at one end of its molecular chain, or a perfluoropolyether containing hydroxyl groups at both ends of its molecular chain, the average molecular weight of perfluoropolyether being from 500 to 4000.

2. The fluorinated ether polymer of claim 1, wherein n is an integer, on average, ranging from 10 to 30.

3. The fluorinated ether polymer of claim 1, wherein the number average molecular weight of $R^f$ is from 1000 to 3000.

4. The fluorinated ether polymer of claim 1, wherein $R^f$ is derived from $F(CFCF_3CF_2O)_nCFCF_3COOH$,
$F(CFCF_3CF_2O)_nCFCF_3CH_2OH$,
$HO(CH_2CH_2O)_mCH_2CF_2O(CF_2CF_2O)_p(CF_2O)_qCF_2CH_2(OCH_2CH_2)_mOH$
$HOCH_2CF_2O(CF_2CF_2O)_p(CF_2O)_nCF_2CH_2OH$
$HOOCCF_3FC(CFCF_3CF_2O)_nCFCF_3COOH$
$F(CF_2CF_2O)_nCFCF_3COOH$
$HOOCCFCF_3(CF_2CF_2O)_nCFCF_3COOH$
$F(CF_2CF_2O)_nCF_2COOH$
$HOOCCF_2(CF_2CF_2O)_nCF_2COOH$
$F(CF_2CF_2OCF_2CF_2CF_2O)_nCF_2COOH$
$HOOCCF_2(CF_2CF_2OCF_2CF_2CF_2O)_nCF_2COOH$
$HOOCCH_2CF_2O(CF_2CF_2O)_m(CF_2O)_nCF_2CH_2COOH$
$CF_3O(CF_2CF_2O)_m(CF_2O)_nCF_2CH_2COOH$
$HOOC(OCH_2CH_2)_nCH_2CF_2O(CF_2CF_2O)_m(CF_2O)_nCF_2CH_2(OCH_2CH_2)_nCOOH$
$CF_3O(CF_2CF_2O)_m(CF_2O)_nCF_2CH_2(OCH_2CH_2)_nCOOH$
$F(CFCF_3CF_2O)_nCFCF_3CH_2OH$
$HOCH_2CF_3FC(CFCF_3CF_2O)_nCFCF_3CH_2OH$
$F(CF_2CF_2O)_nCFCF_3CH_2OH$
$HOCH_2CFCF_3(CF_2CF_2O)_nCFCF_3CH_2OH$
$F(CF_2CF_2O)_nCF_2CH_2OH$
$HOCH_2CF_2(CF_2CF_2O)_nCF_2CH_2OH$
$F(CF_2CF_2OCF_2CF_2CF_2O)_nCF_2CH_2OH$
$HOCH_2CF_2(CF_2CF_2OCF_2CF_2CF_2O)_nCF_2CH_2OH$
$HOCH_2CH_2CF_2O(CF_2CF_2O)_m(CF_2O)_nCF_2CH_2CH_2OH$
$CF_3O(CF_2CF_2O)_m(CF_2O)_nCF_2CH_2CH_2OH$
$HOCH_2(OCH_2CH_2)_nCH_2CF_2O(CF_2CF_2O)_m(CF_2O)_nCF_2CH_2(OCH_2CH_2)_nCH_2OH$, or
$CF_3O(CF_2CF_2O)_m(CF_2O)_nCF_2CH_2(OCH_2CH_2)_nCH_2OH$ wherein m, n, p, q are integers, and on average, independently ranging from 1 to 50.

5. The fluorinated ether polymer of claim 1, wherein the number average molecular weight of the fluorinated ether polymer is from 1000 to 100000.

6. The fluorinated ether polymer of claim 1, wherein the number average molecular weight of the fluorinated ether polymer is from 2000 to 5000.

7. A method for preparing the fluorinated ether polymer of claim 1, comprising:

a) mixing a perfluoropolyether containing $R_f$, monomers that are capable of forming structures A and B according to claim 1, and an inhibitor that stabilizes carbon double bonds;

b) heating the mixture to a temperature ranging from 90 to 120° C., and c) maintaining the temperature for 2 to 5 hours.

8. The method of claim 7, wherein the molar ratio of perfluoropolyether containing $R^f$, monomer that is capable of forming structure A, and monomer that is capable of forming structure B is 1:1-15:1-15.

9. The method of claim 8, wherein the molar ratio of perfluoropolyether containing $R^f$, monomer that is capable of forming structure A, and monomer that is capable of forming structure B is 1:5-10:5-10.

10. A method of using a fluorinated ether polymer to form a coating onto a substrate, comprising applying and then curing the fluorinated ether polymer on the substrate.

11. A coating composition which contains a fluorinated ether polymer according to claim 1 or prepared by the method of claim 7.

* * * * *